(12) United States Patent
Tsubokura et al.

(10) Patent No.: US 6,390,536 B2
(45) Date of Patent: May 21, 2002

(54) MOUNTING STRUCTURE FOR CENTER RAIL OF SLIDE DOOR

(75) Inventors: Ichiro Tsubokura; Satoshi Arakawa, both of Kariya (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 0 days.

(21) Appl. No.: 09/739,016

(22) Filed: Dec. 19, 2000

(30) Foreign Application Priority Data

Dec. 22, 1999 (JP) ............................................ 11-364158

(51) Int. Cl.$^7$ ................................................. B60J 5/06
(52) U.S. Cl. ...................................................... 296/155
(58) Field of Search ............................ 296/155; 49/213, 49/214

(56) References Cited

U.S. PATENT DOCUMENTS

| | | | |
|---|---|---|---|
| 3,312,015 A | * | 4/1967 | Plegat |
| 4,413,444 A | * | 11/1983 | Chikaraishi |
| 5,322,339 A | | 6/1994 | Dubernard |
| 6,244,652 B1 | * | 6/2001 | Shoudou et al. |

FOREIGN PATENT DOCUMENTS

| | | |
|---|---|---|
| JP | 1-68222 | 5/1989 |
| JP | 4-72725 | 11/1992 |
| JP | 5-254346 | 10/1993 |
| JP | 6-12976 | 4/1994 |

* cited by examiner

*Primary Examiner*—Joseph D. Pape
*Assistant Examiner*—Scott Carpenter
(74) *Attorney, Agent, or Firm*—Oliff & Berridge, PLC (57) ABSTRACT

In a mounting structure for a center rail, a recess extending horizontally along the lower edge of a window opening of a lateral face of a vehicle body is formed, and the center rail is disposed in the recess to guide a slide door. The center rail is divided in the vertical direction and thus composed of an upper rail member and a lower rail member. The upper rail member is securely fitted to an upper part of the recess and covered with an opaque elongation of the lower edge of a window glass. After mounting the slide door to the lateral face of the vehicle body and painting the vehicle body, the lower rail member painted in a color different from that of the vehicle body is mounted so as to cover a lower part of the recess.

11 Claims, 5 Drawing Sheets

МОUNTING STRUCTURE FOR CENTER RAIL OF SLIDE DOOR

INCORPORATION BY REFERENCE

The disclosure of Japanese Patent Application No. 11-364158 filed on Dec. 22, 1999 including the specification, drawings and abstract is incorporated herein by reference in its entirety.

BACKGROUND OF THE INVENTION

1. Field of the Invention

The invention relates to a mounting structure of a center rail for guiding a slide door on the lateral face of a vehicle body.

2. Description of Related Art

Figure 4:
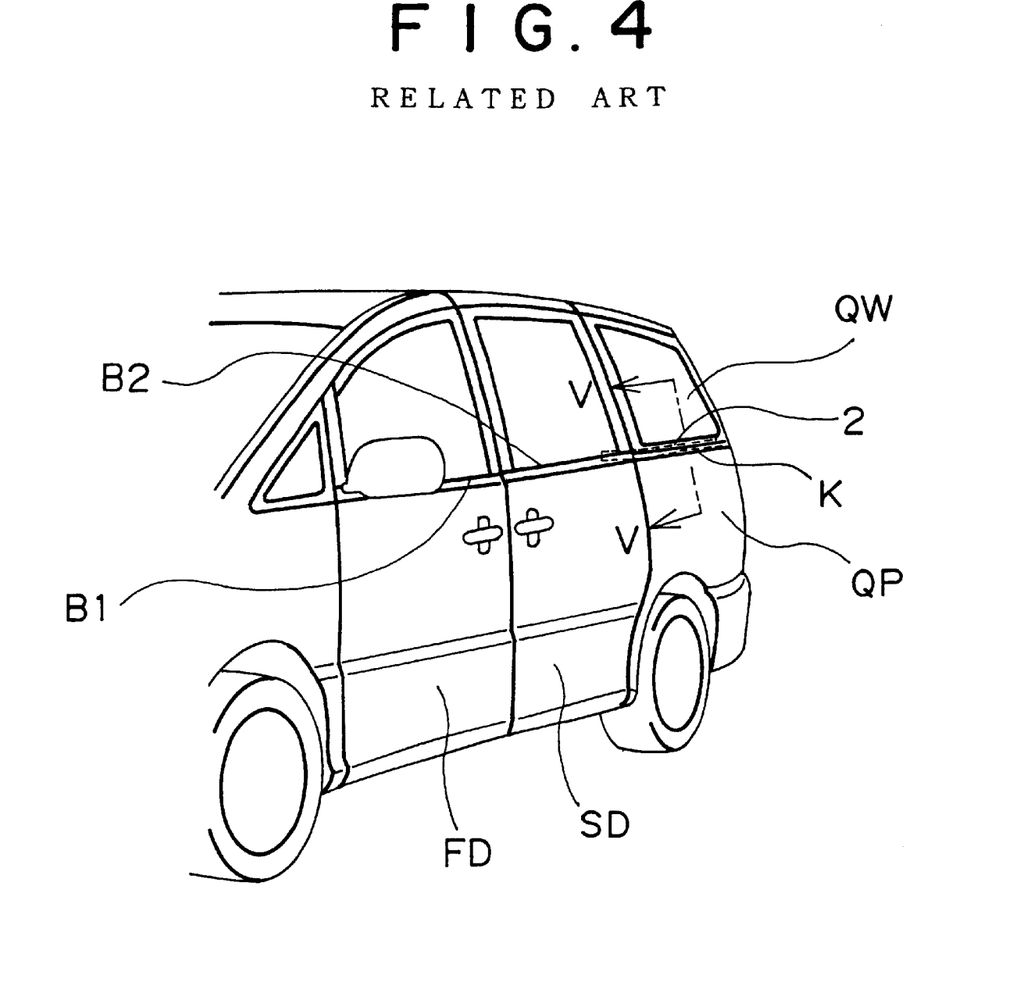
FIG. 4 is a perspective view of the lateral face of a vehicle.
Figure 5:
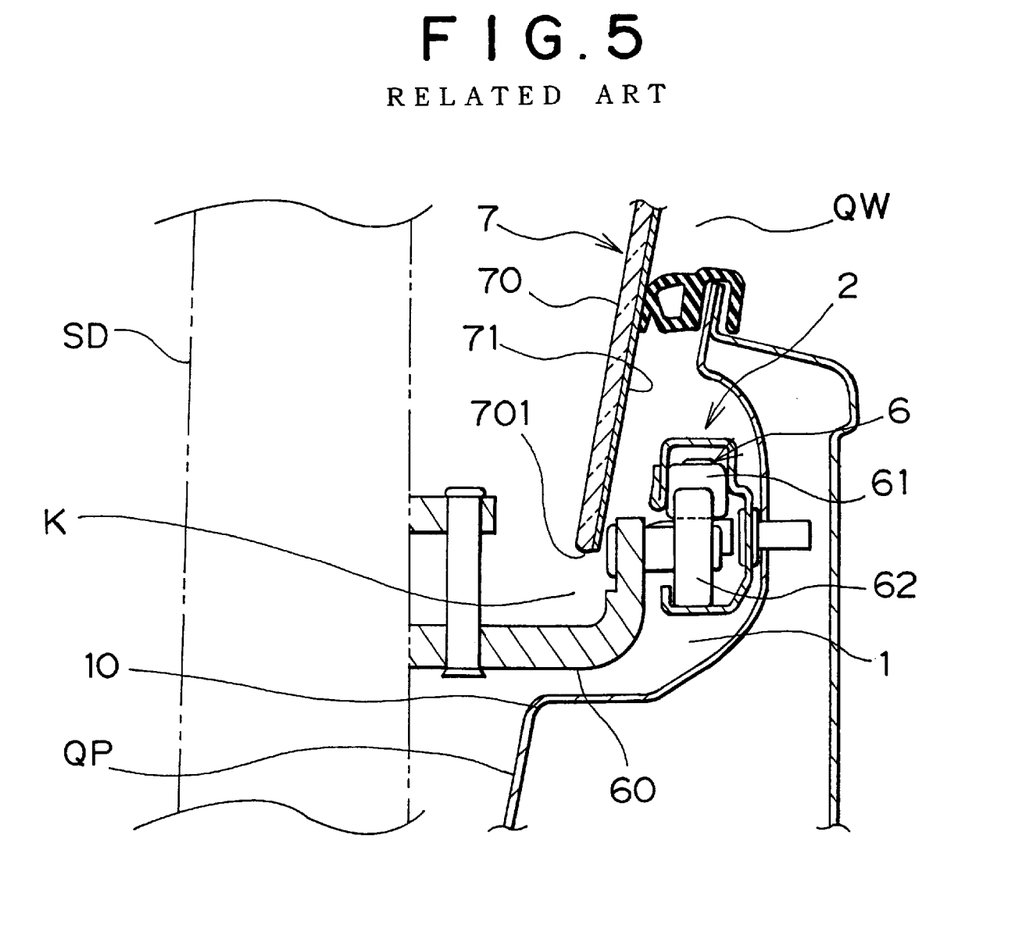
FIG. 5 is a cross-sectional view of a mounting structure for a center rail, taken along a line V—V in FIG. 4.

Japanese Utility Model Laid-Open No. HEI 6-12976 discloses a mounting structure of a center rail for guiding a slide door as shown in FIGS. 4, 5. In this structure, a recess 1 is formed at the upper edge of a quarter panel QP along the opening lower edge of a quarter window QW on the lateral face of a vehicle body behind a slide door SD, and a center rail 2 is securely fitted into the recess 1. The lower edge of a window glass 7 shielding the opening of the quarter window QW is elongated further downwards than the opening lower edge of the quarter window QW to form an opaque elongation 70. The recess 1 and the center rail 2 are covered with the elongation 70 with a view to enhancing the visual attractiveness of the lateral face of the vehicle body.

A center roller 6 composed of a horizontal roller 61 and a vertical roller 62 is disposed at the end of a bracket 60 protruding from the inner face of the slide door SD. The center rail 2 is a long-extending member having a generally inverse-C-shaped cross-section corresponding to the center roller 6 and is tightly fastened to the recess 1 by means of bolts. The center rail 2 rollably guides the horizontal roller 61 with its upper part and the vertical roller 62 with its bottom part. The inner face of the elongation 70 of the window glass 7 is painted in a black coating material 71 and made opaque. A gap K ensuring the orbit of the bracket 60 of the center rail 6 is provided between a lower edge 701 of the elongation 70 and a lower edge 10 of the recess 1.

On the lateral face of the vehicle body, a belt line B1 of a front door FD, a belt line B2 of the slide door SD and the gap K are aligned continuously. Thus, the belt lines B1, B2 and the gap K constitute a rectilinear side line, whereby the gap K is made unnoticeable.

In manufacturing processes of a vehicle, for the purpose of preventing the surfaces of the vehicle body from being damaged before being painted or the chromatic difference from being generated between the vehicle body and doors or the like, the doors are mounted before the vehicle body is painted, and the vehicle body and the doors are painted altogether. For this reason, the center rail 2, which is required to mount the slide door SD, is also mounted to the vehicle body before being painted. The center rail 2 is also painted in the same color as that of the vehicle body and the slide door. Accordingly, after the vehicle has been manufactured, the lower portions of the recess 1 and the center rail 2 painted in the same color as that of the vehicle body are visible in the gap K when viewed from the outside of the vehicle. However, if a lace different in color from the vehicle body is arranged along the belt lines B1, B2 of the doors FD, SD, a sense of continuity is lost between the lace and the gap K painted in the same color as that of the vehicle body. This causes a problem of making the gap K rather conspicuous.

SUMMARY OF THE INVENTION

It is an object of the invention to provide a mounting structure of a center rail for a slide door wherein the structure is continuously aligned with belt lines of doors and chromatically identical thereto so that the visual attractiveness of the lateral face of a vehicle body can be enhanced.

In a mounting structure for a center rail of a slide door according to a first aspect of the invention, a recess extending horizontally along the lower edge of a window opening of a lateral face of a vehicle body is formed, a center rail is disposed in the recess to guide the slide door, the lower edge of a window glass shielding the window opening is elongated downwardly of the lower edge of the window opening to form an opaque elongation, and the elongation is positioned outside the recess to cover an upper part of the center rail. In this structure, the center rail is composed of two vertically divided members, namely, an upper rail member and a lower rail member. The upper rail member is securely fitted to the recess, and the lower rail member is superposed on the outside of the upper rail member or securely fitted to the recess along the lower edge of the upper rail member. It is possible to mount only one of the constituents of the center rail, that is, the upper rail member when mounting the slide door, and mount the lower rail member after the painting of the vehicle body has been carried out in a series of manufacturing processes of the vehicle. Thereby it becomes possible to paint the mounting structure in a color different from that of the vehicle body and the slide door.

The lower rail member may be mounted so as to cover a lower part of the recess located below the lower edge of the elongation of the window glass. If the lower rail member is painted in a color different from that of the vehicle body and the slide door, for example, in the same color as that of a lace arranged along the belt lines of the doors, the lower rail member and the belt lines can constitute a side line having a sense of continuity on the lateral face of the vehicle body. Thus, it is possible to enhance the visual attractiveness of the lateral face of the vehicle body.

The mounting structure of the aforementioned aspect may be constructed as follows. The slide door is provided with a center roller having a horizontal roller and a vertical roller. The upper rail member is composed of a guide having a generally inverse-U-shaped cross-section and guiding rollwise the horizontal roller and a lower end in the shape of a vertical wall extending downwardly of the guide. The lower end is tightly fastened, by means of a plurality of first bolts provided with a predetermined interval formed therebetween, to a generally vertical lateral wall of the recess. The lower rail member is composed of a horizontal flat guide guiding rollwise the vertical roller, an extension extending outwards from an outer edge of the guide to cover a lower wall of the recess, and an upper end in the shape of a vertical wall extending upwards from an inner edge of the guide. The upper end of the lower rail member is superposed on the outside of the lower end of the upper rail member to cover the first bolts provided with a predetermined interval formed therebetween, integrated with the lower end, and tightly fastened, by means of a plurality of second bolts, to the lateral wall of the recess. Thus, the number of bolts that are visible from the gap between the lower edge of the elongation of the window glass and the lower edge of the recess is reduced. This makes it possible to enhance the visual attractiveness of the lateral face of the vehicle.

The lower rail member may be provided at a plurality of positions along the longitudinal direction with protrusions protruding upwards from an upper edge of the upper end, and the upper rail member may be provided with an upper wall and a lower wall abutting on upper ends of the protrusions and a lower face of the guide of the lower rail member respectively and sandwiching them in the vertical direction. Thus, the lower rail member can be vertically positioned with respect to the upper rail member easily and precisely.

The mounting structure of the aforementioned aspect may be constructed as follows. The upper rail member and the lower rail member are respectively provided at their front ends with curvatures curving towards the interior of the vehicle. A notch is formed in the curvature of the lower rail member, and a pin is arranged in a standing manner on the curvature of the upper rail member. The curvature of the lower rail member is positioned by fitting the pin into the notch. Thus, the curvature of the lower rail member can be positioned with respect to the upper rail member and secured thereto easily and precisely.

A horizontal support supporting the vertical roller when mounting the slide door may be formed in the proximity of the front end of the upper rail member or the front end of the recess. Thus, the slide door can be stably mounted to the vehicle body before mounting the lower rail member.

DETAILED DESCRIPTION OF PREFERRED EMBODIMENT

Hereinafter, a preferred embodiment of the invention will be described with reference to the drawings.

This embodiment is applicable to a lateral part of a vehicle as shown in FIG. 4. That is, a recess 1 is formed in an upper edge of a quarter panel QP along an opening lower edge of a quarter window QW on the lateral face of the vehicle behind a slide door SD, and a center rail 2 is securely fitted to the recess 1. The recess 1 and the center rail 2 are covered with an opaque elongation 70 formed in a lower edge portion of a window glass 7 of the quarter window QW. In the lateral face of the vehicle body, a gap K between a lower edge 701 of the elongation 70 of the window glass 7 and a lower edge 10 of the recess 1 is matched with belt lines B1, B2 of a front door FD and the slide door SD, so that the belt lines B1, B2 and the gap K constitute a side line extending straight and continuously.

Figure 1:
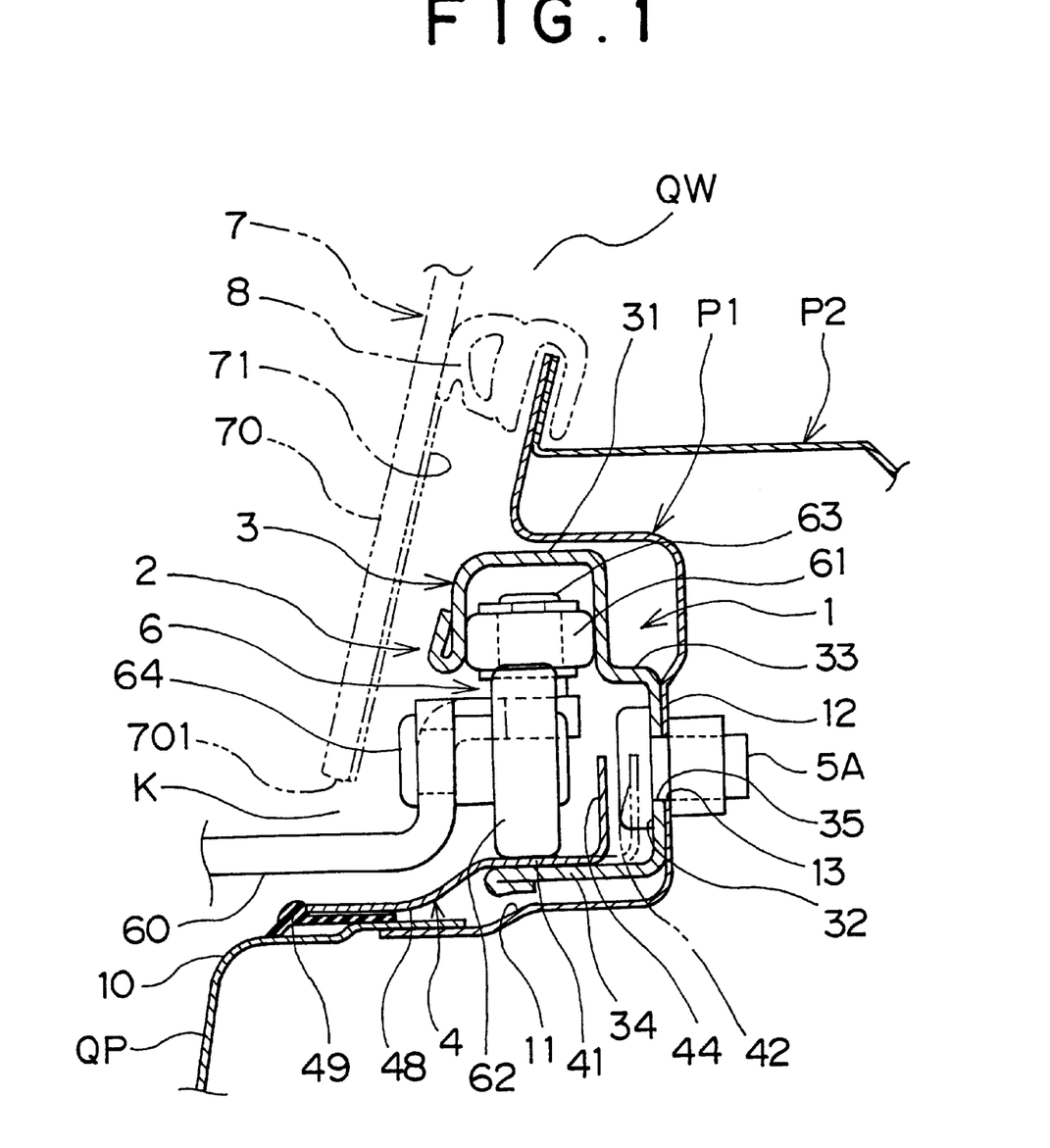
FIG. 1 is a cross-sectional view of a mounting structure for a center rail according to an embodiment of the invention, taken along a line I—I in FIG. 3.
Figure 2:
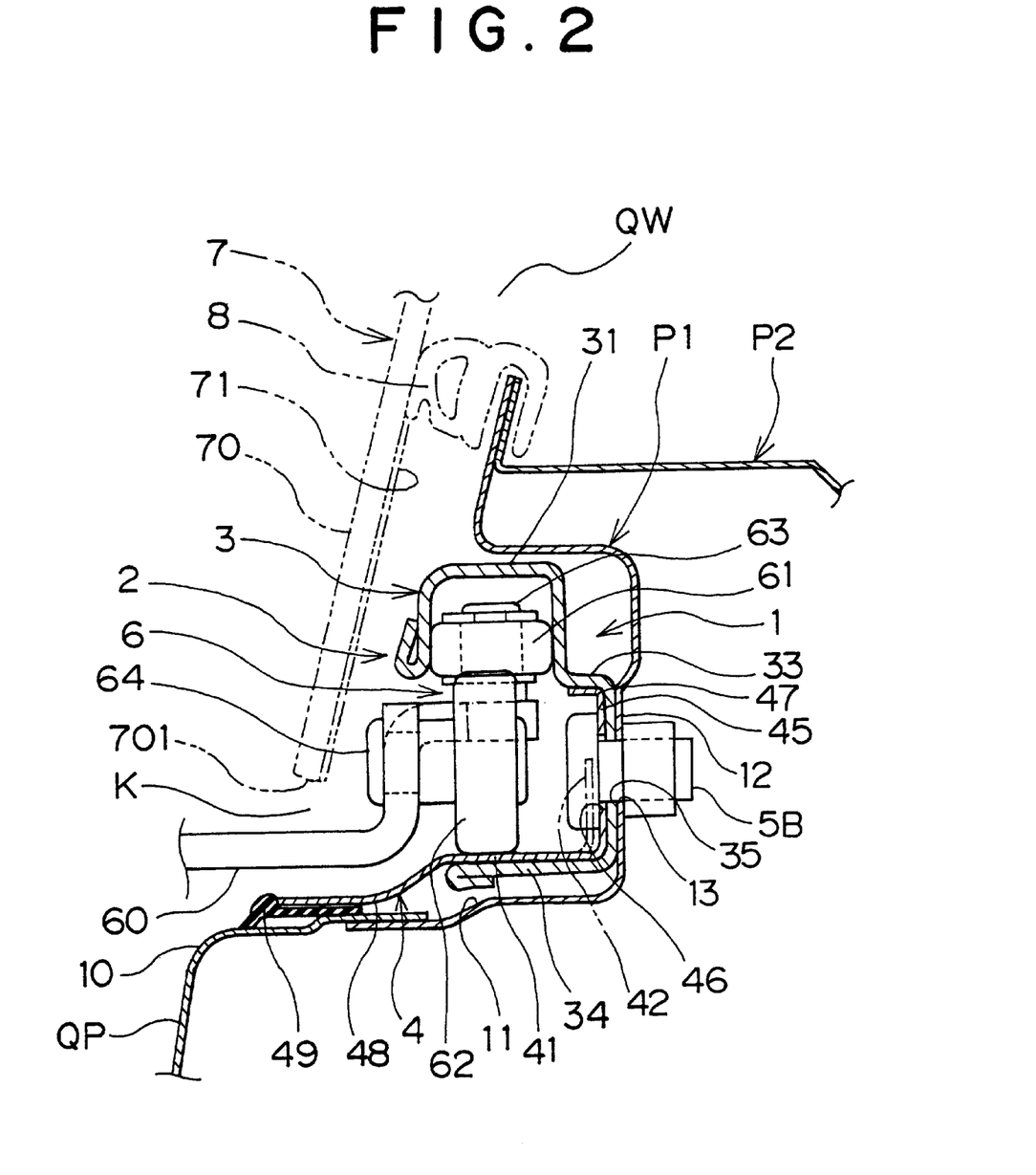
FIG. 2 is a cross-sectional view of the mounting structure for the center rail according to the embodiment of the invention, taken along a line II—II in FIG. 3.

As shown in FIGS. 1, 2, the recess 1 is formed in a panel member P1 of a generally U-shaped cross-section. The panel member P1 is securely fitted to the upper edge of the quarter panel QP and opens to the outside of the vehicle. In the panel member P1, an outer edge of a lower wall 11 is superposed on the upper edge of the quarter panel QP and welded thereto. On the other hand, a generally vertical upper edge flange is superposed on an upper edge flange of an inner panel P2 on the side of a cabin and welded thereto, so that the welded portion constitutes the opening lower edge of the quarter window QW. A plurality of (five in FIG. 3) threaded holes 13 are formed at predetermined intervals along the longitudinal direction in a lateral wall 12 of the recess 1. Each of the threaded holes 13 has a weld nut securely fitted to the side of the back face of the panel.

Figure 3:
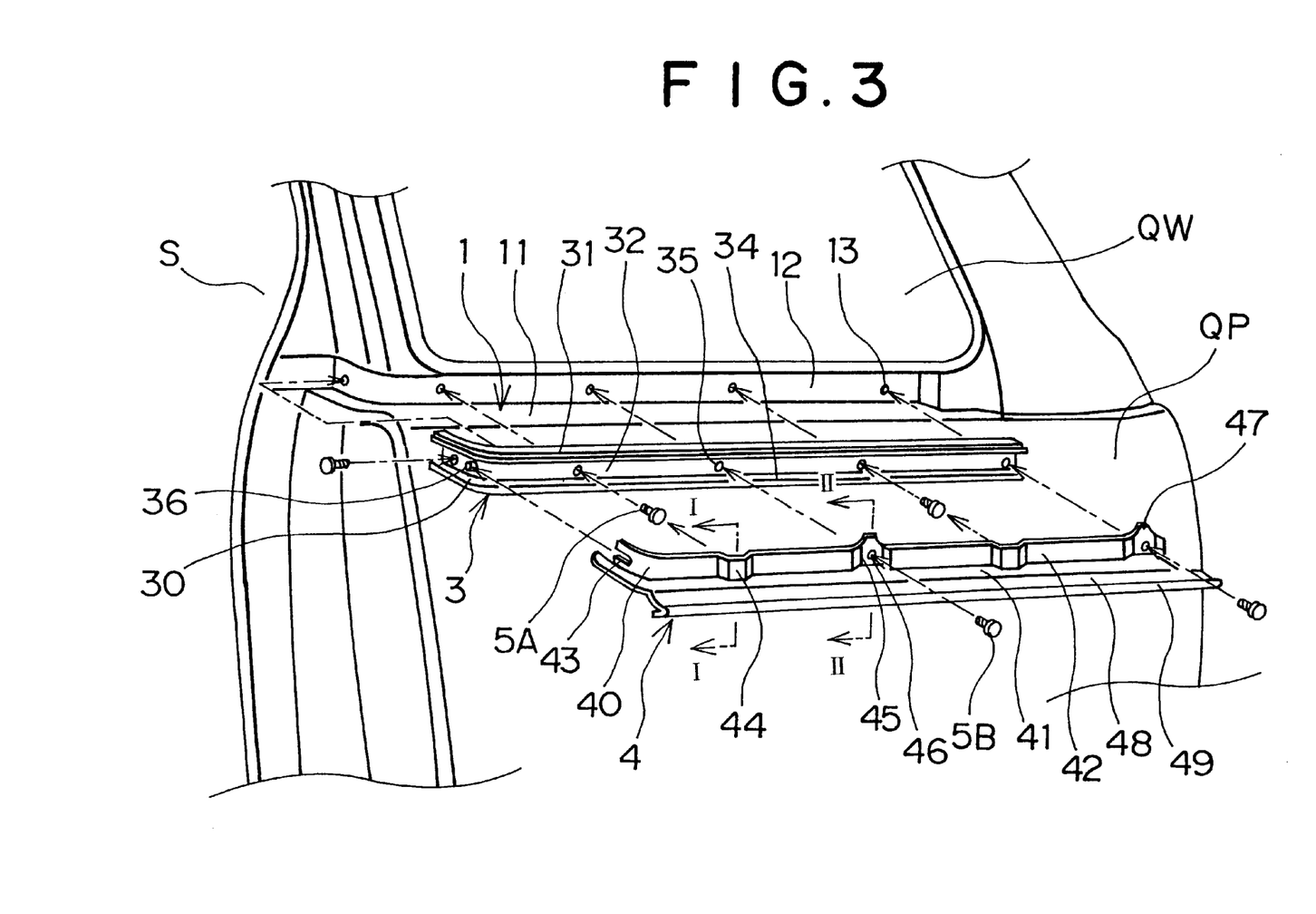
FIG. 3 is an exploded perspective view of the mounting structure for the center rail according to the embodiment of the invention.

As shown in FIGS. 1, 2 and 3, the center rail 2 is composed of two divided rail members, namely, an upper rail member 3 and a lower rail member 4. The upper rail member 3 is a long-extending member having a cross-sectional shape unchanged along the entire length. A curvature 30 that is curved towards the interior of the vehicle along a rear edge of an opening S of the slide door on the lateral face of the vehicle body is formed at the front end of the upper rail member 3. A guide 31 of a generally inverse-U-shaped cross-section opening downwards is formed at the upper end of the upper rail member 3. The guide 31 guides rollwise a horizontal roller 61 constituting a center roller 6 of the slide door SD.

A generally vertical lateral wall 32 extending downwards from the guide 31 of the upper rail member 3 is offset towards the interior of the vehicle with respect to the guide 31. A stepped upper wall 33 is formed between the guide 31 and the lateral wall 32. The upper rail member 3 is further provided with a lower wall 34 extending from a lower edge of the lateral wall 32 towards the outside of the vehicle and facing the guide 31 in the vertical direction.

A plurality of (five) bolt holes 35 corresponding to the threaded holes 13 in the lateral wall 12 of the recess 1 are formed at predetermined intervals along the longitudinal direction in the lateral wall 32 of the upper rail member 3. A pin 36 is arranged in a standing manner on the curvature 30 of the upper rail member 3 at the front end of the lateral wall 32.

The lateral wall 32 of the upper rail member 3 is superposed on the lateral wall 12 of the recess 1 along the recess 1 of the lateral wall of the vehicle body. First bolts 5A are screwed into the threaded holes 13 in the lateral wall 12 of the recess 1 through the first, second and fourth ones of the bolt holes 35, and securely tightened.

In manufacturing processes of a vehicle, the upper rail member 3 is mounted to support the center roller 6 of the slide door SD before the vehicle body is painted. The center roller 6 is composed of a horizontal roller 61 and a vertical roller 62. The horizontal roller 61 is rotatably supported by a first support shaft 63 arranged vertically in a standing manner at the end of a bracket 60 protruding from a door inner plate (not shown). The vertical roller 62 is rotatably supported by a second support shaft 64 arranged substantially horizontally in a standing manner at the end of the bracket 60. The horizontal roller 61 is rollably fitted into the guide 31 of the upper rail member 3, and the vertical roller 62 is laid on the lower wall 34 and supported thereby. In this case, the vertical roller 62 is temporarily supported by the lower wall 34 of the upper rail member 3. That is, the vertical roller 62 is laid on the lower wall 34 of the upper rail member 3 such that the vertical roller 62 can be pressed slightly upwards. The painting process is carried out in this state, and the vehicle body, the slide door SD and the upper rail member 3 are painted in the same color.

The lower rail member 4 is mounted after the aforementioned painting process. The lower rail member 4 is a long-extending body extending along the upper rail member 3. A curvature 40 that is curved towards the interior of the vehicle along the curvature 30 of the upper rail member 3 is formed at the front end of the lower rail member 4. The lower rail member 4 is provided with a horizontal guide 41 guiding rollwise the vertical roller 62 of the center roller 6 along the entire length. A vertical lateral wall 42 protruding upwards is formed along the lateral edge of the guide 41 on the side of the interior of the vehicle. The lateral wall 42 is lower than the lateral wall 32 of the upper rail member 3.

In the curvature 40 of the lower rail member 4, the front end of the guide 41 protrudes further forwards than the front edge of the lateral wall 42, and a groove-like notch 43 opening in coordination with the pin 36 of the upper rail member 3 is formed at the front end of the lateral wall 42.

Bulges 44 are formed on the lateral wall 42 of the lower rail member 4 at positions corresponding to the second and fourth ones of the first bolts 5A that are used to clamp the upper rail member 3 to the recess 1. The bulges 44 swell towards the exterior of the vehicle and cover the heads of the bolts. Mounting seats 45 are formed in the lateral wall 42 at positions corresponding to the third and fifth ones of the bolt holes 35 in the upper rail member 3. The mounting seats 45 swell towards the interior of the vehicle and are superposed on the regions around the bolt holes 35 in the lateral wall 32 of the upper rail member 3. Bolt holes 46 are formed at the centers of the respective mounting seats 45. The bolt holes 46 correspond to the bolt holes 35 and are slightly larger in diameter than the bolt holes 35.

Protrusions 47 are formed on the upper edge of the lateral wall 42 of the lower rail member 4. The protrusions 47 protrude upwards from the upper edges of the respective mounting seats 45, and the upper ends of the protrusions 47 are bent towards the exterior of the vehicle. The protrusions 47 are dimensioned such that their height from the guide 41 coincides with the height of the lateral wall 32 of the upper rail member 3, namely, the height of the upper wall 33 from the lower wall 34.

An extension 48 extending outwards from the guide 41 is formed in a rear part of the lower rail member 4 other than the curvature 40. The extension 48 slightly slants with a smooth and generally downwardly extending curve, from the guide 41 to the outer edge.

The entire surface of the lower rail member 4 is painted in black nylon fine particles in coordination with a black lace (not shown) arranged along the belt lines B1, B2 (FIG. 4) of the front door FD and the slide door SD, and with the intention of deadening rolling noise of the vertical roller 62. A rubber sealing material 49 is stuck to the extension 48 along its edge.

In mounting the lower rail member 4, the slide door SD is displaced forwards and arranged such that the slide door opening S in the vehicle body is closed. The front end of the guide 41 of the curvature 40 of the lower rail member 4 is inserted into a space between the lower wall 34 of the upper rail member 3 and the vertical roller 62 that has already been installed. The vertical roller 62 is then laid rollably on the upper face of the guide 41, and the pin 36 of the upper rail member 3 is fitted into the notch 43 at the front end of the lateral wall 42. A groove is formed along the circumference of the root of the pin 36 and fitted into the notch 43. The entire lower face of the guide 41 is then superposed on the upper face of the lower wall 34 of the upper rail member 3, and the lower wall 11 of the recess 1 is covered with the extension 48. The protrusions 47 are thereafter brought into abutment on the upper wall 33 of the upper rail member 3, and the heads of the first bolts 5A used to clamp the upper rail member 3 are covered with the bulges 44. The mounting seats 45 are then superposed on the regions around the other bolt holes 35 in the lateral wall 32 of the upper rail member 3.

In this case, the protrusions 47 and the guide 41 of the lower rail member 4 are clamped between the upper wall 33 and the lower wall 34 of the upper rail member 3, such that the lower rail member 4 is fitted into a lower part of the upper rail member 3. Therefore, the lower rail member 4 can be reliably positioned in the vertical direction. A plurality of second bolts 5B are screwed into the threaded holes 13 in the recess 1 through the bolt holes 46, 35. Thus, the lower rail member 4 is integrated with the upper rail member 3 and secured to the recess 1.

Because the pin 36 fitted into the notch 43 formed in the curvature 40 at the front end of the lower rail member 4 can be displaced along the notch 43, it is possible to absorb the dimensional difference between the curvature 40 and the curvature 30 of the upper rail member 3. Also, because the aforementioned groove formed in the root of the pin 36 is fitted into the notch 43, it is possible to reliably fit the curvature 40 along the curvature 30 of the upper rail member 3.

The elongation 70 of the window glass 7 protruding downwards from the opening lower edge of the quarter window QW is opaque with its inner face painted in a black coating material 71, and covers the upper part of the recess 1. The lower edge 701 of the elongation 70 is set at a position substantially corresponding to the upper edge of the lateral wall 42 of the lower rail member 4. A gap K for ensuring the orbit of the bracket 60 of the center roller 6 is provided between the lower edge 701 of the elongation 70 and the lower edge 10 of the recess 1. The reference numeral 8 in FIGS. 1, 2 denotes a sealing material for the window glass.

According to this embodiment, the center rail 2 is composed of two separate members, namely, the upper rail member 3 and the lower rail member 4, and the lower rail member 4 is mounted to the lower part of the upper rail member 3 with the lower part of the recess 1 being covered, after the vehicle body has been painted. Therefore, the lower rail member 4 is the only component that is visible from the gap K. Accordingly, if the lower rail member 4 is mounted to the lateral face of the vehicle body and painted in the same color as that of the belt lines B1, B2 of the front door FD and the slide door SD, for example, that of the lace arranged along the belt lines B1, B2, it is possible to highlight a single-color continuous side line composed of the lace and the gap K, and enhance the visual attractiveness of the vehicle body.

In mounting the lower rail member 4, the protrusions 47 are brought into abutment on the upper wall 33 of the upper rail member 3, whereby it becomes possible to reliably position the lower rail member 4 in the vertical direction. Because the number of the second bolts 5B for securing the lower rail member 4 is minimized, the mounting operation is easy to perform, and the number of bolts visible from the gap K can also be reduced. Because the pin 36 is fitted into the notch 43 formed in the curvature 40, it is possible to absorb the dimensional difference and perform the fitting operation easily and reliably.

The lower wall 34 of the upper rail member 3 can support the vertical roller 62 of the center roller 6. Therefore, even if the lower rail member 4 has not been prepared before painting the vehicle body, the slide door SD can be stably mounted to the vehicle body. The supporting portion is not limited to the lower wall 34 of the upper rail member 3 and may be formed at the front end of the lower wall 11 of the recess 1 of the vehicle body.

The invention is not limited to the aforementioned embodiment. For example, although not shown in the drawings, it is possible to employ the following structure. The upper rail member is composed of the guide for guiding the horizontal roller of the center roller and the lateral wall extending vertically downwards, and the lateral wall is securely fitted to the upper part of the recess of the lateral wall of the vehicle body. On the other hand, the lower rail member is composed of the vertically extending lateral wall, the elongation and the guide of the vertical roller, and the lower rail member is arranged vertically adjacent and parallel to the lower part of the upper rail member without being superposed thereon. The upper edge of the lateral wall of the lower rail member is brought into abutment on the lower edge of the lateral wall of the upper rail member and positioned thereon. Thus, the lower rail member is securely fitted to the lower part of the recess.

What is claimed is:

1. A mounting structure for a center rail of a slide door, comprising:

a recess formed so as to extend horizontally along a lower edge of a window opening in a lateral face of a vehicle body;

a center rail disposed in the recess to guide the slide door with a center roller having a vertical roller; and a window glass shielding the window opening, an opaque elongation being formed below the lower edge of the window opening and the elongation being located outside the recess so that a lower edge of the window glass covers an upper part of the center rail, wherein the center rail comprises two vertically divided members, namely, an upper rail member and a lower rail member, the upper rail member is securely fitted to the recess, the lower rail member is at least one of superposed on the outside of the upper rail member and securely fitted to the recess along a lower edge of the upper rail member and the upper rail member comprises a lower wall to support the vertical roller.

2. The mounting structure according to claim 1, wherein the lower rail member is mounted so as to cover a lower part of the recess located below the lower edge of the elongation of the window glass.

3. The mounting structure according to claim 1, wherein the slide door is provided with the center roller having a horizontal roller and the vertical roller, the upper rail member is composed of a guide having a generally inverse-U-shaped cross-section and guiding rollwise the horizontal roller and a lower end in the shape of a vertical wall extending downwardly of the guide, and the lower rail member is composed of a horizontal flat guide guiding rollwise the vertical roller, an extension extending outwards from an outer edge of the guide to cover a lower wall of the recess, and an upper end in the shape of a vertical wall extending upwards from an inner edge of the guide.

4. The mounting structure according to claim 1, wherein the lower wall is formed in the proximity of the front end of the upper rail member and supports the vertical roller when mounting the slide door.

5. The mounting structure according to claim 1, wherein the lower rail member is painted in the same color as the color of a lace arranged along a belt line of the slide door.

6. The mounting structure according to claim 1, wherein the lower end of the upper rail member is tightly fastened, by means of a plurality of first bolts provided with a predetermined interval formed therebetween, to a generally vertical lateral wall of the recess, and the upper end of the lower rail member is superposed on the outside of the lower end of the upper rail member to cover the first bolts, integrated with the lower end, and tightly fastened, by means of a plurality of second bolts provided with a predetermined interval formed therebetween, to the lateral wall of the recess.

7. The mounting structure according to claim 1, wherein the lower rail member is provided at a plurality of positions along the longitudinal direction with protrusions protruding upwards from an upper edge of the upper end, and the upper rail member is provided with an upper wall and a lower wall abutting on upper ends of the protrusions and a lower face of the guide of the lower rail member respectively and sandwiching them in the vertical direction.

8. The mounting structure according to claim 1, wherein the upper rail member and the lower rail member are respectively provided at their front ends with curvatures curving towards the interior of the vehicle, a notch is formed in the curvature of the lower rail member, a pin is arranged in a standing manner on the curvature of the upper rail member, and the curvature of the lower rail member is positioned by fitting the pin into the notch.

9. A mounting structure for a center rail of a slide door, comprising:

a recess formed so as to extend horizontally along a lower edge of a window opening in a lateral face of a vehicle body;

a center rail disposed in the recess to guide the slide door; and a window glass shielding the window opening, an opaque elongation being formed below the lower edge of the window opening and the elongation being located outside the recess so that a lower edge of the window glass covers an upper part of the center rail, wherein the center rail comprises two vertically divided members, namely, an upper rail member and a lower rail member, the upper rail member is securely fitted to the recess, the lower rail member is at least one of superposed on the outside of the upper rail member and securely fitted to the recess along a lower edge of the upper rail member, the slide door is provided with a center roller having a horizontal roller and a vertical roller, the upper rail member is composed of a guide having a generally inverse-U-shaped cross-section and guiding rollwise the horizontal roller and a lower end in the shape of a vertical wall extending downwardly of the guide, the lower rail member is composed of a horizontal flat guide guiding rollwise the vertical roller, an extension extending outwards from an outer edge of the guide to cover a lower wall of the recess, and an upper end in the shape of a vertical wall extending upwards from an inner edge of the guide, the lower end of the upper rail member is tightly fastened, by means of a plurality of first bolts provided with a predetermined interval formed therebetween, to a generally vertical lateral wall of the recess and the upper end of the lower rail member is superposed on the outside of the lower end of the upper rail member to cover the first bolts, integrated with the lower end, and tightly fastened, by means of a plurality of second bolts provided with a predetermined interval formed therebetween, to the lateral wall of the recess.

10. A mounting structure for a center rail of a slide door, comprising:

a recess formed so as to extend horizontally along a lower edge of a window opening in a lateral face of a vehicle body;

a center rail disposed in the recess to guide the slide door; and a window glass shielding the window opening, an opaque elongation being formed below the lower edge of the window opening and the elongation being located outside the recess so that a lower edge of the window glass covers an upper part of the center rail, wherein the center rail comprises two vertically divided members, namely, an upper rail member and a lower rail member, the upper rail member is securely fitted to the recess, the lower rail member is at least one of superposed on the outside of the upper rail member and securely fitted to the recess along a lower edge of the upper rail member, the slide door is provided with a center roller having a horizontal roller and a vertical roller, the upper rail member is composed of a guide having a generally inverse-U-shaped cross-section and guiding rollwise the horizontal roller and a lower end in the shape of a vertical wall extending downwardly of the guide, the lower rail member is composed of a horizontal flat guide guiding rollwise the vertical roller, an extension extending outwards from an outer edge of the guide to cover a lower wall of the recess, and an upper end in the shape of a vertical wall extending upwards from an inner edge of the guide, the lower rail member is provided at a plurality of positions along the longitudinal direction with protrusions protruding upwards from an upper edge of the upper end and the upper rail member is provided with an upper wall and a lower wall abutting on upper ends of the protrusions and a lower face of the guide of the lower rail member respectively and sandwiching them in the vertical direction.

11. A mounting structure for a center rail of a slide door, comprising:

a recess formed so as to extend horizontally along a lower edge of a window opening in a lateral face of a vehicle body;

a center rail disposed in the recess to guide the slide door; and a window glass shielding the window opening, an opaque elongation being formed below the lower edge of the window opening and the elongation being located outside the recess so that a lower edge of the window glass covers an upper part of the center rail, wherein the center rail comprises two vertically divided members, namely, an upper rail member and a lower rail member, the upper rail member is securely fitted to the recess, the lower rail member is at least one of superposed on the outside of the upper rail member and securely fitted to the recess along a lower edge of the upper rail member, the slide door is provided with a center roller having a horizontal roller and a vertical roller, the upper rail member is composed of a guide having a generally inverse-U-shaped cross-section and guiding rollwise the horizontal roller and a lower end in the shape of a vertical wall extending downwardly of the guide, the lower rail member is composed of a horizontal flat guide guiding rollwise the vertical roller, an extension extending outwards from an outer edge of the guide to cover a lower wall of the recess, and an upper end in the shape of a vertical wall extending upwards from an inner edge of the guide, the upper rail member and the lower rail member are respectively provided at their front ends with curvatures curving towards the interior of the vehicle, a notch is formed in the curvature of the lower rail member, a pin is arranged in a standing manner on the curvature of the upper rail member and the curvature of the lower rail member is positioned by fitting the pin into the notch.

* * * * *